United States Patent [19]
Davidson

[11] Patent Number: 5,968,155
[45] Date of Patent: Oct. 19, 1999

[54] DIGITAL GATE COMPUTER BUS

[75] Inventor: Howard L. Davidson, San Carlos, Calif.

[73] Assignee: Sun Microsystems, Inc., Mountain View, Calif.

[21] Appl. No.: 08/948,766

[22] Filed: Oct. 10, 1997

Related U.S. Application Data

[63] Continuation of application No. 08/518,483, Aug. 23, 1995, abandoned.

[51] Int. Cl.[6] ................................................ G06F 15/00
[52] U.S. Cl. ............................ 710/126; 710/129; 710/131; 710/132; 712/1
[58] Field of Search .................................. 395/306, 309, 395/800, 311, 325; 364/420, 900; 341/22; 379/327

[56] References Cited

U.S. PATENT DOCUMENTS

| | | | |
|---|---|---|---|
| 4,459,693 | 7/1984 | Prang et al. | 371/20 |
| 4,833,708 | 5/1989 | Goodrich | 379/327 |
| 4,857,833 | 8/1989 | Gonzalez et al. | 324/73 R |
| 4,862,245 | 8/1989 | Pashby et al. | 357/70 |
| 4,870,704 | 9/1989 | Matelan et al. | 364/200 |
| 4,922,449 | 5/1990 | Donaldson et al. | 364/900 |
| 5,003,467 | 3/1991 | Donaldson et al. | 364/200 |
| 5,122,691 | 6/1992 | Balakrishnan | 307/475 |
| 5,325,299 | 6/1994 | Moses et al. | 364/420 |
| 5,430,847 | 7/1995 | Bradley et al. | 395/325 |
| 5,432,949 | 7/1995 | Baba | 395/800 |
| 5,493,657 | 2/1996 | Van Brunt et al. | 395/308 |
| 5,511,223 | 4/1996 | Scecina et al. | 395/800 |
| 5,544,334 | 8/1996 | Noll | 395/309 |
| 5,585,600 | 12/1996 | Froebel et al. | 174/52.4 |
| 5,625,780 | 4/1997 | Hsieh et al. | 395/311 |
| 5,680,126 | 10/1997 | Kikinis | 341/22 |
| 5,773,994 | 6/1998 | Jones | 326/41 |
| 5,774,684 | 6/1998 | Haines et al. | 395/309 |

*Primary Examiner*—Ayaz R. Sheikh
*Assistant Examiner*—Eric S. Thlang
*Attorney, Agent, or Firm*—Pennie & Edmonds LLP; William S. Galliani

[57] ABSTRACT

A computer bus includes a set of computer bus input nodes to receive a set of computer bus input signals generated by system cards attached to the computer bus. The computer bus input signals are processed by a set of bus bit processors. Each of the bus bit processors includes a digital gate logic circuit to perform a logical OR operation on a subset of the set of computer bus input signals. The subset of computer bus input signals corresponds to the signals carried by a single line of a traditional computer bus. Each bus bit processor generates a bus bit processor output signal. The set of bus bit processors thereby form a set of bus bit processor output signals. The bus bit processor output signals are applied to computer bus output nodes for processing by the system cards in a conventional manner. Thus, the digital gate logic circuits of the bus bit processors execute the function performed by traditional hardwired computer bus structures. Consequently, the disclosed computer bus avoids the speed limitations and complicated transmission line design considerations associated with traditional computer bus structures.

18 Claims, 6 Drawing Sheets

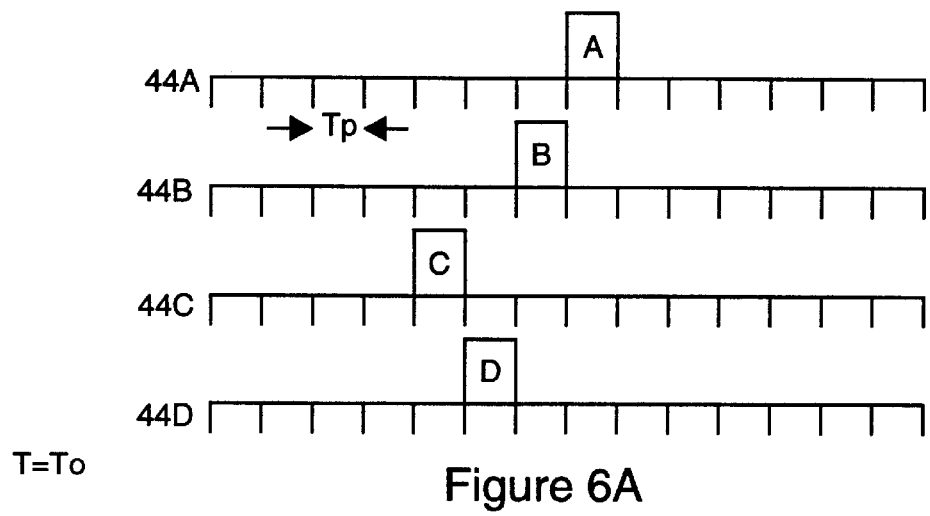
T=To      Figure 6A
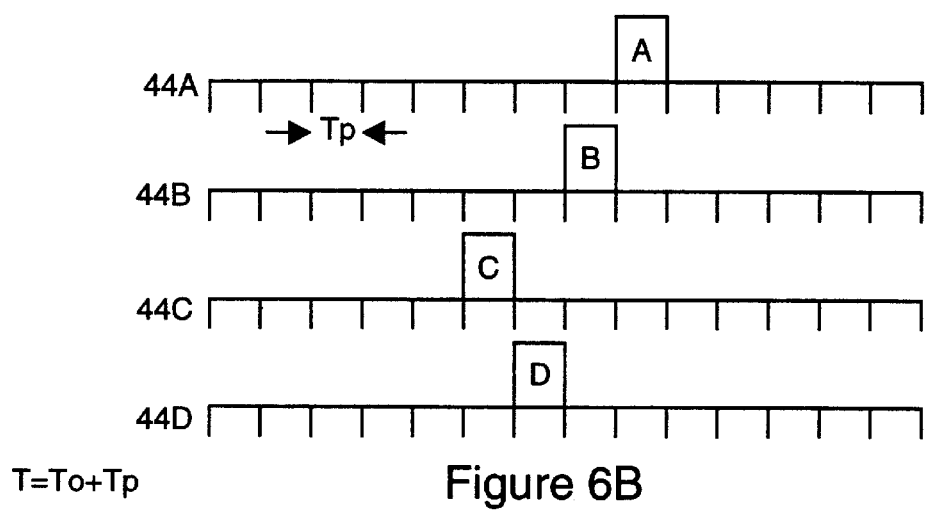
T=To+Tp      Figure 6B
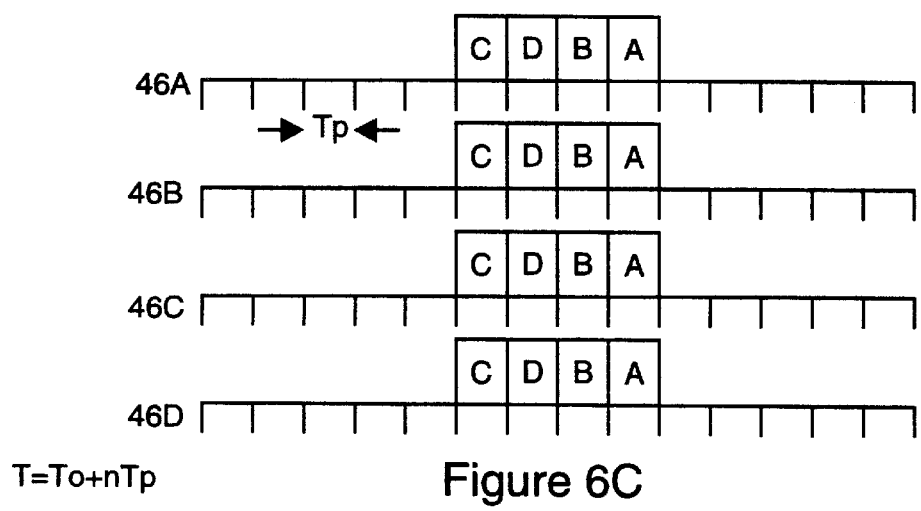
T=To+nTp      Figure 6C

DIGITAL GATE COMPUTER BUS

This is a continuation of application Ser. No. 08/518,483 filed Aug. 23, 1995 now abandoned.

BRIEF DESCRIPTION OF THE INVENTION

This invention relates generally to computer buses. More particularly, this invention relates to a computer bus that is implemented with digital gates to avoid the physical limitations associated with traditional computer bus designs.

BACKGROUND OF THE INVENTION

A computer bus is a communication link used to connect multiple computer subsystems. For example, a computer bus is used to link the memory and processor, and to link the processor with input/output (I/O) devices. Computer buses are traditionally classified as follows: processor-memory buses, I/O buses, or backplane buses. Processor-memory buses are short, generally high speed, and matched to the memory system so as to maximize memory-processor bandwidth. I/O buses, by contrast, can be lengthy, can have many types of devices connected to them, and often have a wide range in the data bandwidth of the devices connected to them. Backplane buses are designed to allow processors, memory, and I/O devices to coexist on a single bus. Backplane buses balance the demands of processor-memory communication with the demands of I/O device-memory communication. Backplane buses received their name from the fact that they are typically built into a computer backplane—the fundamental interconnection structure within the computer chassis. Processor, memory, and I/O boards plug into a backplane and then use the backplane bus to communicate.

Processor-memory buses are often design-specific, while both I/O buses and backplane buses are frequently standard buses with parameters established by industry standards. The distinction between bus types is becoming increasingly difficult to specify. Thus, the present application generically refers to computer buses to encompass all processor-memory buses, I/O buses, and backplane buses.

The problem with computer buses is that they create a communication bottleneck since all input/output must pass through a single bus. Thus, the bandwidth of the bus limits the throughput of the computer. Physical constraints associated with existing computer buses are beginning to limit the available performance improvements generally available in computers.

The physical operation and constraints of existing computer bus designs are most fully appreciated with reference to FIG. 1. FIG. 1 illustrates a computer bus 20 positioned on a backplane 22. The computer bus 20 is a set of wires, effectively forming a transmission line. A random number of system cards (or cards) 24A–24N are attached to the computer bus 20. By way of example, the cards 24 may include a video processing card, a memory controller card, an I/O controller card, and a network card. Each card 24 is connected to the computer bus 20 through a connector 26. Thus, each card 24 is electrically connected to the set of wires forming the computer bus 20. As a result, one card, say card 24A, can communicate with another card, say 24N, by writing information onto the computer bus 20. Only one card 24 can write information onto the computer bus 20 at a time, thus a computer bus 20 can generate a performance bottleneck as different cards 24 wait to write information onto the bus 20.

Another problem associated with a traditional computer bus 20, as shown in FIG. 1, is that its performance is constrained by complicated electrical phenomenon. For example, the connectors 26 effectively divide the bus into transmission line segments, resulting in complicated transmission line effects. Note that the transmission line segments will vary depending upon the number of cards 26 connected to the bus 20. This periodic loading of the bus 20 makes it difficult to optimize bus performance. In addition, each connector 26 produces a lumped discontinuity with parallel capacitance and series inductance, thereby complicating the electrical characteristics of the bus 20. Note also that "T-connections" are formed between the wires of a computer bus 20 and the wires to a connector 26. The T-connections complicate the electrical characteristics of the computer bus 20.

Each card 24 includes a transceiver circuit 28 connected to a card logic circuit 30, which performs the functional operations associated with the card 24. The transceiver circuit 28 is used to read and write information on the bus 20. That is, the transceiver circuit 28 reads information from the bus 20, the card logic circuit 30 processes the information, and then the transceiver circuit 28 writes processed information to the bus 20. Additional electrical complications arise with the transceiver circuits 28. For example, transmission line segments are formed between each connector 26 and each bus transceiver 28 circuit. In addition, the transceiver circuits 28 present an impedance at their package pins that depends upon the circuit design, the electrical state of the transceiver, and the packaging.

In sum, the computer bus 20 constitutes a transmission line with complicated electrical interactions caused by such factors as transmission line segments and connectors forming lumped discontinuities with parallel capacitance and series inductance. The bus 20 may be terminated with termination resistors (R) to reduce transmission line effects, such as reflections and mismatches. Nevertheless, solutions of this sort do not overcome all transmission line problems associated with a computer bus 20.

Given these complicated electrical interactions, signals on the bus 20 do not experience a uniform rise. That is, if the bus 20 was a perfect transmission line, then high signals (digital ONES) written to the bus 20 would experience a uniform rise. However, in view of the complicated electrical interactions on the bus 20, high signals frequently experience one or more spurious signal transitions before reaching a final peak value that can be processed. Waiting for signals to settle causes delays.

Another problem is that the complicated electrical interactions on the computer bus 20 require higher powered drive signals, and thus more power dissipation.

It is difficult to avoid these problems by changing the electrical characteristics of the bus 20. That is, it is difficult to design a bus with improved transmission line properties in view of the complicated factors that establish bus 20 performance. Thus, it would be highly desirable to design a new type of bus whose performance is not contingent upon complicated transmission line effects associated with prior art buses.

SUMMARY OF THE INVENTION

The apparatus of the invention is a digital gate computer bus. The computer bus includes a set of computer bus input nodes to receive a set of computer bus input signals generated by system cards attached to the computer bus. The computer bus input signals are processed by a set of bus bit processors. Each of the bus bit processors includes a digital circuit to perform a logical OR operation on a subset of the set of computer bus input signals. The subset of computer bus input signals corresponds to the signals carried by a single line of a traditional computer bus. Each bus bit processor generates a bus bit processor output signal. The set of bus bit processors thereby form a set of bus bit processor output signals. The bus bit processor output signals are applied to computer bus output nodes for processing by the system cards in a conventional manner. Thus, the digital gates of the bus bit processors execute, preferably in a semiconductor based material, the function performed by traditional hardwired computer bus structures.

The method of the invention includes the step of applying a plurality of computer bus input signals to a set of computer bus input nodes, processing the set of computer bus input signals with digital logical OR circuits to generate bus bit output signals, and routing the bus bit output signals to a set of computer bus output nodes. The computer bus output nodes convey the bus bit output signals to computer system cards for conventional processing.

The disclosed computer bus is faster than traditional computer buses. The speed of the computer bus is only limited by charging and discharging internal nodes in an integrated circuit, rather than by a combination of time of flight and loading effects on long wires, as is the case with a traditional computer bus. That is, by moving the shared portion of a computer bus onto a gate based digital circuit, the electrical length of the bus can be reduced to an arbitrarily small dimension. The bus topology provides point-to-point connections between a signal source and a signal destination. Consequently, the problematic transmission line effects of traditional buses are avoided. Despite its radically different design and configuration, the computer bus of the invention otherwise operates in a standard manner. Thus, the computer bus can be used in existing computers and system designers can still rely upon known bus design techniques.

BRIEF DESCRIPTION OF THE DRAWINGS

For a better understanding of the nature and objects of the invention, reference should be made to the following detailed description taken in conjunction with the accompanying drawings, in which:

FIG. 6 illustrates the signal pipelining that can be performed in accordance with the digital gate computer bus of the invention.

Like reference numerals refer to corresponding parts throughout the several views of the drawings.

DETAILED DESCRIPTION OF THE INVENTION

Figure 1:
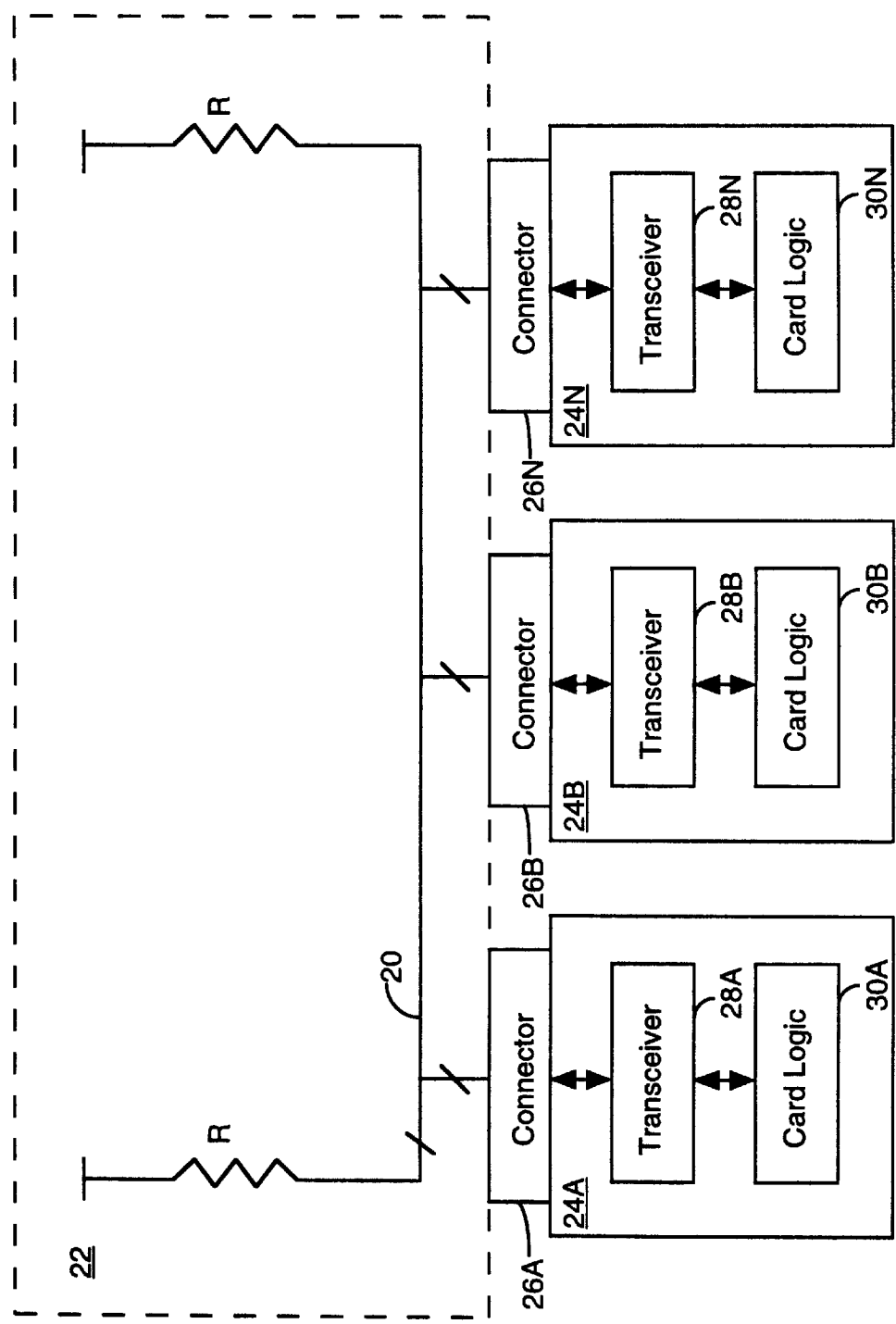
FIG. 1 illustrates a prior art computer bus.
Figure 2:
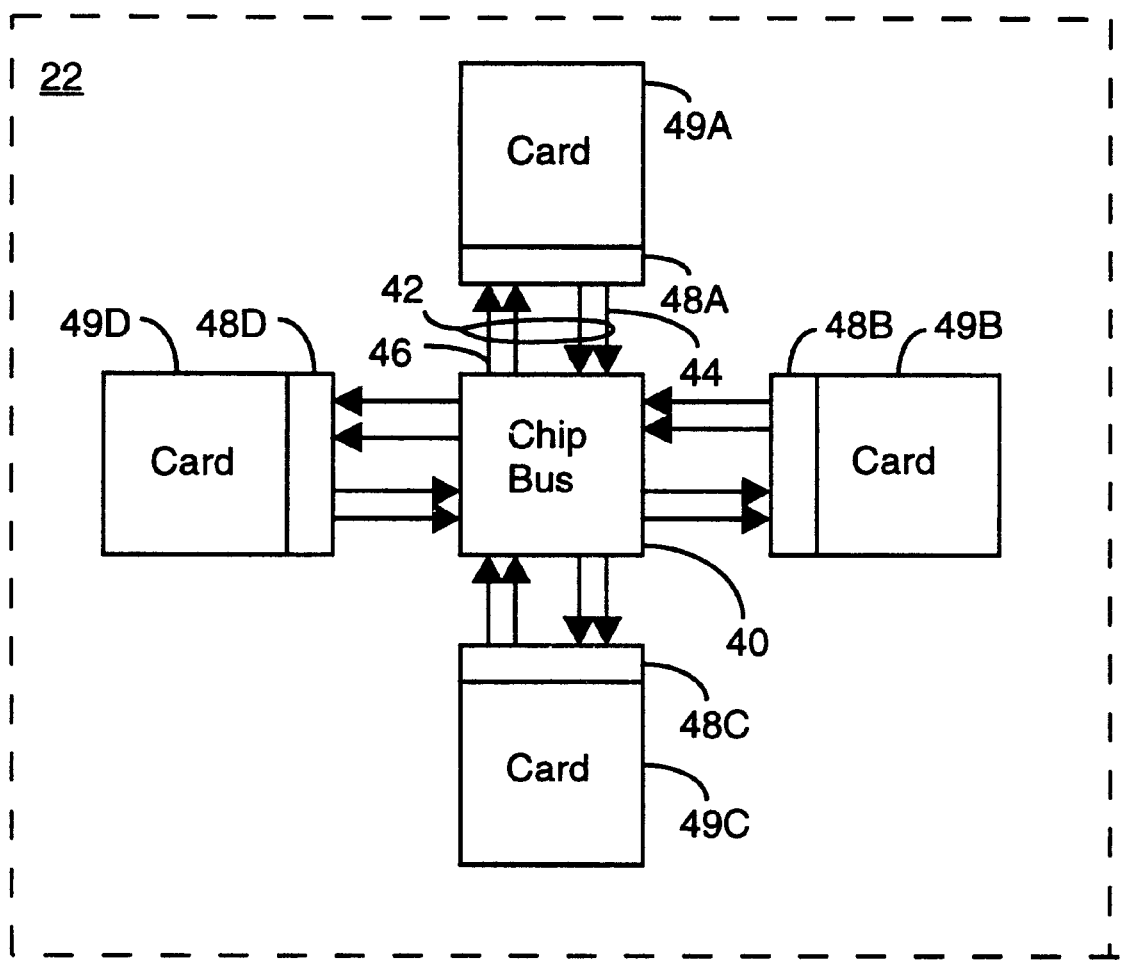
FIG. 2 illustrates the digital gate computer bus of the invention and its relationship to four system cards.

FIG. 2 illustrates a digital gate computer bus 40, also called a chip bus, in accordance with the invention. The chip bus 40 of the invention uses digital circuits to perform the function executed by a conventional computer bus. That is, the chip bus 40 of the invention is used to perform a set of logical OR operations with digital gates so that these operation do not have to be performed as wired OR operations on the wires of a computer bus. In this way, the transmission line problems associated with prior art computer buses are eliminated.

The operation of the invention is more fully appreciated with a simple example. Typically, each card attached to a computer bus has N communication bits corresponding to the N wires forming the computer bus. Thus, for example, if four cards are attached to a computer bus, then each card has a designated bit that reads and writes signals to a designated wire of the computer bus. If any card on the bus writes a digital ONE to this designated wire of the computer bus, then all cards on the bus read a digital high signal for this designated bit. This is a logical OR operation performed by a hardwired circuit (the wire of the bus). The present invention eliminates the physical wires of traditional computer buses and executes the operation associated with such wires with digital gates. That is, the chip bus 40 of the invention performs logical OR operations with digital gates in order to eliminate the transmission line problems associated with prior art computer buses.

Returning to FIG. 2, the chip bus 40 is positioned on a backplane 22. Chip bus communication lines 42 are electrically connected to the chip bus 40. In one embodiment, chip bus input lines 44 carry input signals to the chip bus 40, the chip bus performs logical OR operations on the input signals and generates output signals which are applied to chip bus output lines 46. The chip bus communication lines 42 are electrically connected to connectors 48, which in turn are electrically connected to cards 49. The connectors 48 and cards 49 may be of the type known in the art. Thus, the chip bus 40 of the invention can be used with prior art computer configurations.

Figure 3:
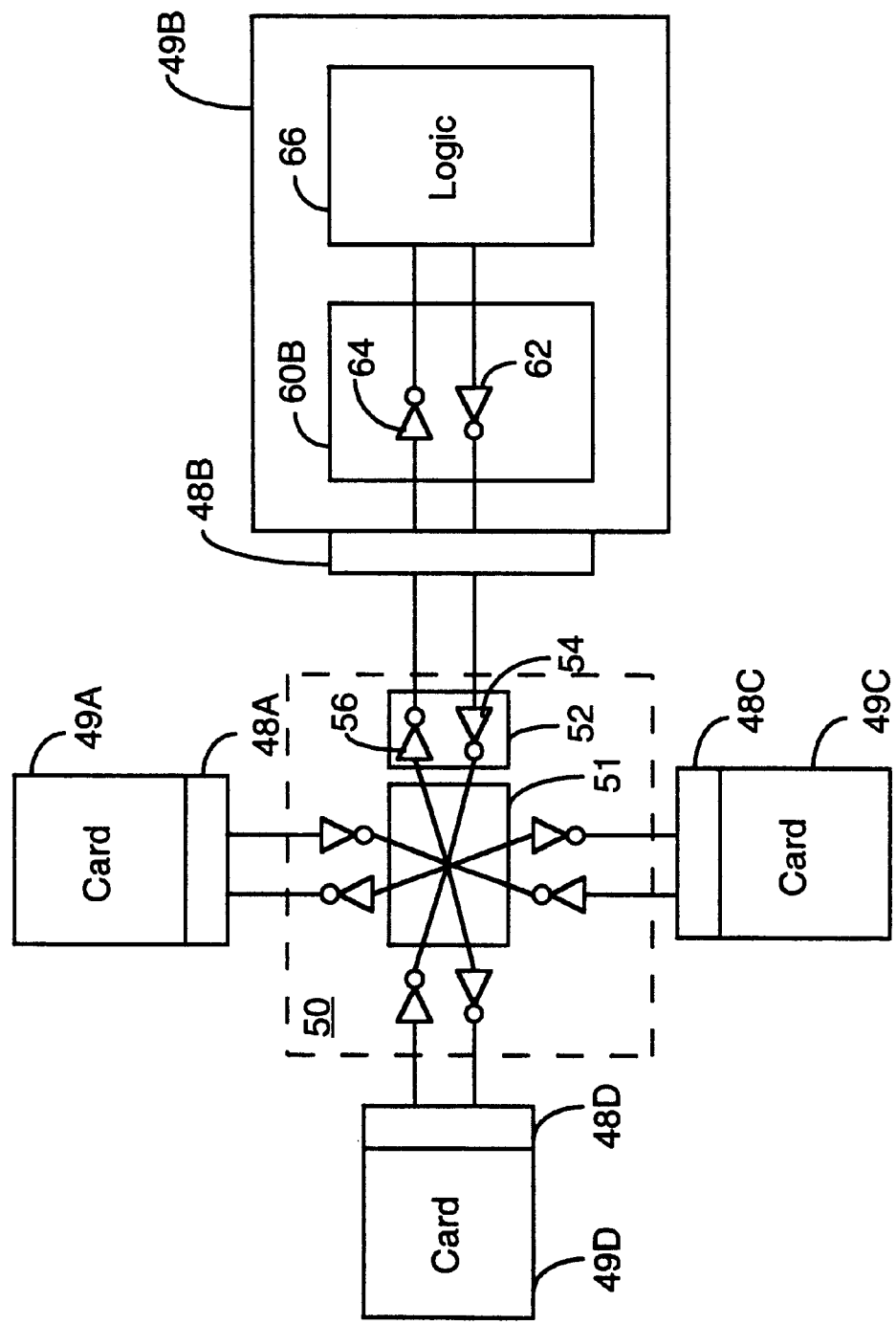
FIG. 3 is a schematic view of a single chip bus bit processor of the digital gate computer bus shown in FIG. 2.

Turning now to FIG. 3, illustrated therein is a single bit embodiment of the chip bus 40 of the invention. In particular, the figure illustrates a chip bus bit processor 50. The chip bus bit processor 50 includes a logical OR circuit 51, illustratively shown as a wired OR circuit. In this embodiment of the invention, the chip bus bit processor 50 also includes a card signal driver 52 with a bus input signal driver 54, implemented as an inverter, and a bus output signal driver 56, also implemented as an inverter.

Thus, it can be appreciated that the chip bus bit processor 50 of FIG. 3 receives a single bit input signal from four cards (49A, 49B, 49C, 49D). In particular, each single bit input signal is driven by the bus input signal driver 54 and applied to the logical OR circuit 51. If any single bit input signal is a digital ONE on the logical OR circuit 51, then a high output is generated at all output nodes. For the embodiment of FIG. 3, the high output signal is seen by the card logic circuit 66 after processing by inverters 56 and 64.

As shown in FIG. 3, in one embodiment of the invention, the card 49B may include a card transceiver 60B. In this embodiment, the card transceiver 60B includes a logic output signal driver 62, implemented as an inverter, and a logic input signal driver 64, also implemented as an inverter. The signals from the card transceiver 60B are then processed by a logic circuit 66 in a conventional manner.

Figure 4:
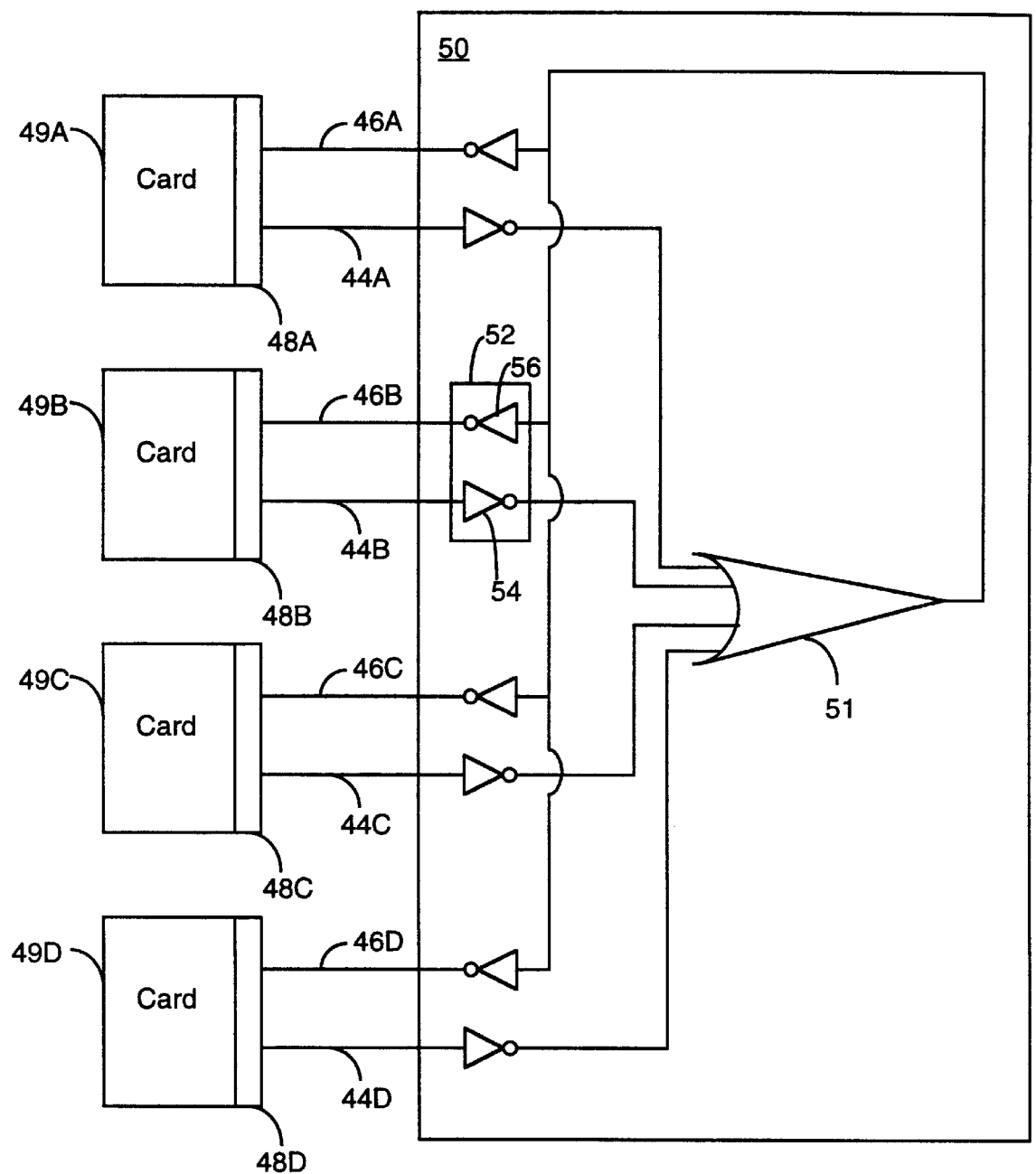
FIG. 4 is a schematic view of a chip bus bit processor implemented with a four input OR gate.

Turning now to FIG. 4, illustrated therein are the same components shown in FIG. 3, but the components are rearranged to more fully describe the invention. In addition, FIG. 3 illustrates the logical OR circuit 51 as being implemented with a four input OR gate. Thus, it is seen in FIG. 4 that each card (49A, 49B, 49C, 49D) generates a single bit signal that is respectively applied to the chip bus input lines (44A, 44B, 44C, 44D). The four signals are routed to the four input OR gate 51. The output of the four input OR gate 51 is then routed back to the cards (49A, 49B, 49C, 49D) through their respective chip bus output lines (46A, 46B, 46C, 46D).

Figure 5:
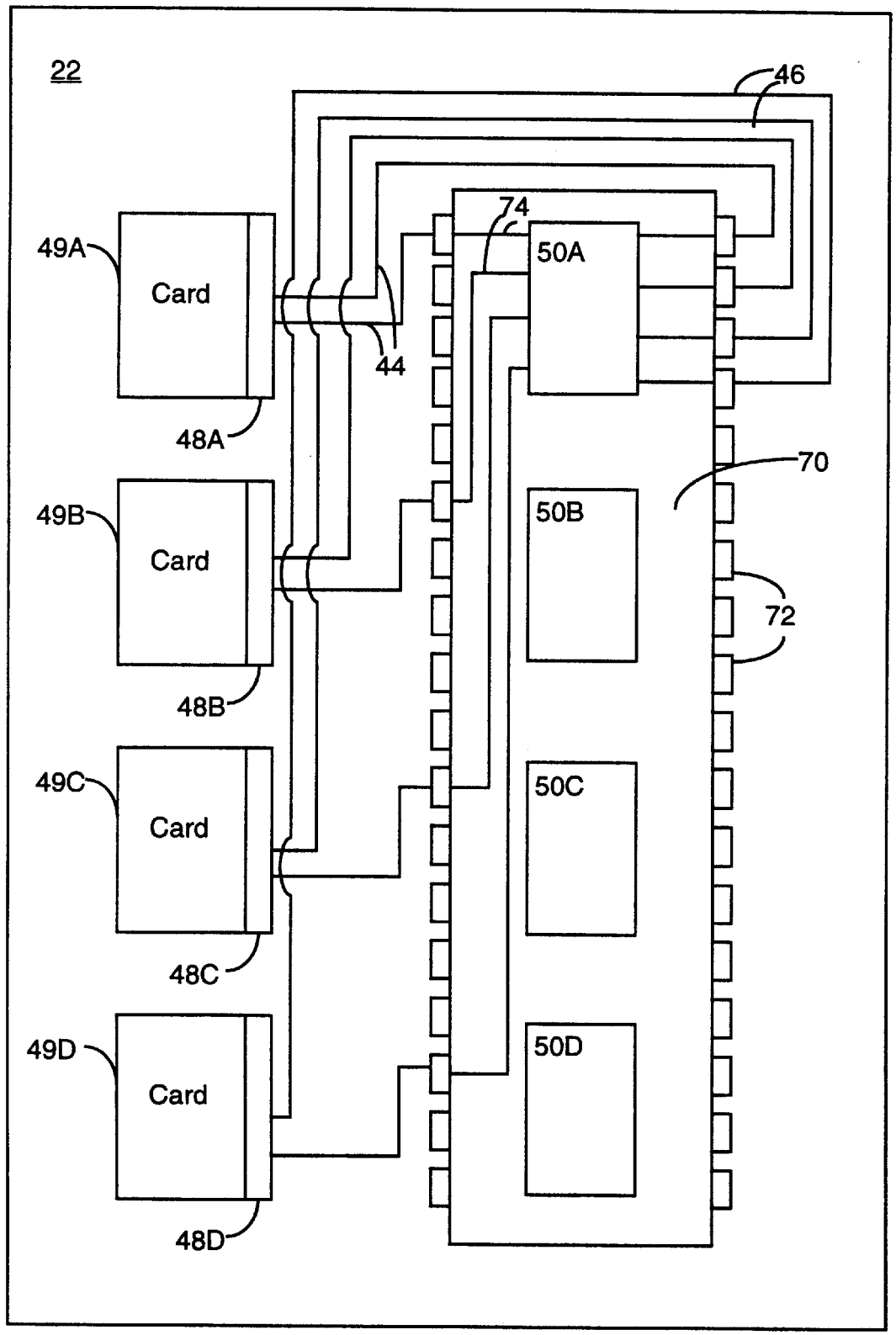
FIG. 5 illustrates a digital gate computer bus package forming a four bit digital gate computer bus.

FIG. 5 illustrates a four bit digital gate computer bus in accordance with the invention. The four bit digital gate computer bus is used in conjunction with four processing cards (49A, 49B, 49C, 49D). The four bit digital gate computer bus includes a chip bus package 70 with package pins 72. Standard packaging techniques may be used to form this structure. Within the package 70 are four chip bus bit processors (50A, 50B, 50C, 50D). The package 70 is positioned on a backplane 22.

Each processing card (49A, 49B, 49C, 49D) generates a single bit signal that is applied to one of the chip bus bit processors 50. In particular, each processing card generates a single bit signal that is applied to a chip bus input line 44 formed on backplane 22. The signal reaches a package pin 72 and is then routed to a chip bus bit processor 50 via a package internal trace 74. After processing by the chip bus bit processor 50 is completed, the output signals are applied to chip bus output lines 46 formed in the backplane 22. The chip bus output lines 46 route the output signals to their respective cards for processing in a standard fashion.

The invention has now been fully described. Attention presently turns to a discussion of various implementation issues. Implementations of the chip bus 40 of the invention will have the shared portion of a physical bus implemented with digital gates and will use point-to-point wiring to connect the daughterboards (cards 24). As used herein, point-to-point wiring refers to wiring running directly between pins of two packages, without "T-connections", "Y-connections", or related configurations or sources which complicate signal transmission.

As shown in FIG. 2, the preferred embodiment of the invention uses separate chip bus input lines 44 and chip bus output lines 46. However, it is possible to use bidirectional wires to make these connections. The bidirectional wires save a factor of two in signals, but cannot reach the speed attainable by the unidirectional technique, unless special transceivers are used that can simultaneously send and receive on the same line. For the highest speed systems, it may be advantageous to use differential simultaneous bidirectional signaling to reduce system noise.

Simultaneous bidirectional transceiver technology has been available in emitter coupled logic for many years. The technology depends on having very high performance differential amplifiers to subtract the outgoing signal from the signal on the pin to recover the incoming signal. Simultaneous bidirectional signaling has been demonstrated in CMOS, but is harder to implement because the close matching and high gain of the bipolar devices is not available.

If the chip bus 40 is used in a synchronous system which is properly arbitrated, it is not necessary to provide any control signals to control who is driving the bus. While additional control signals are not required, the chip bus 40 of the invention does require more wires on the backplane than the traditional bus structure, and also requires IC packages with many pins.

The logical OR circuit 51 may be implemented in any number of manners. For example, wide fan-in pseudo-NMOS gates with four to six inputs have been successful. For a chip bus bit processor 50 that process more than six signals, a gate tree is generally required.

If the electrical distance from the card 49 to the chip bus 40 is less than about half the transition time, the signal can be unterminated, and the driver can be quite small. If the line is long enough to be terminated, it is possible to operate in the 50 to 100 Ohm regime, rather than the sub-20 Ohm regime associated with a heavily loaded conventional bus. Note that the termination can be done by correctly sizing the driver transistors.

One way to use the chip bus 40 is as a drop-in replacement for a traditional bus structure. In this mode, the chip bus provides the advantages of lower power because it is easier to drive the lines, there are smaller propagation delays because the point-to-point wiring is not periodically loaded, and the bus topology is decoupled from the electrical behavior. The chip bus does not suffer from the multiple reflection noise and settling delays associated with classical bus implementations.

In a second implementation of the chip bus 40, a constraint is placed on the wire lengths. It is easiest to think about this in the context of the unidirectional implementation with all wire lengths equal. In this case, under the assumption of no clock skew, the signal duration may be set to the minimal width to ensure recognition. The electrical distance from the card 49 to the chip bus 40 enters into latency, but no longer influences the maximum signalling speed.

The chip bus 40 of the invention is extremely fast. Simulated chip bus 40 designs have shown bit rates of 2.4 Gbits/sec per line. The delay through the chip bus 40 is only 330 pS. A portion of the chip bus's speed is attributable to the fact that input signals to the bus 40 can be pipelined. This operation is illustrated in FIG. 6. In FIG. 6A, four input signals A, B, C, and D are respectively carried by chip bus input lines 44A, 44B, 44C, and 44D at time To. The pulse width of each signal is equivalent to the pulse width of the signal clock, shown as Tp. FIG. 6B illustrates the progression of the four input signals after a clock cycle, that is, at time T=To+Tp. FIG. 6C illustrates the same signals on the chip bus output lines 46A, 46B, 46C, and 46D. The signals appear on the chip bus output lines at a time T=To+nTp, where n is the number of clock cycles required to drive the signals through the chip bus 40. Thus, it can be seen in FIG. 6 that it is possible to have an input signal to the bus and an output signal from the bus every cycle. This pipelining capability results in extremely high processing speeds that are not possible with traditional bus architectures.

Current processor designs have about twenty gates between latches. The sum of the setup and hold time of the latches is around 10% of the cycle time, or two unit gate delays. The bus chip can be modeled as a pure delay, it doesn't change pulse width. This implies that up to ten bus signals could be stacked in one processor cycle. If some margin is allowed for timing tolerances, a practical limit near eight transactions per cycle might be obtained with very careful design.

The real limitations on the speed of the system are clock skew and bit-to-bit skew within a single package. Careful design of the wiring on the backplane 22 allows wire skew to be reduced to below all other skews in the system. Clock skew can be kept low by using self-compensating clock drivers.

If the bus is wide enough that more than one package 70 is required, two elements will contribute to the bit-to-bit skew. One is the difference in average total delay between the parts, and the other is the spread in delay between the pins within a single part. The traditional way of coping with part-to-part variations is to bin the parts. Note that this does not cause yield loss, it just requires that any particular board be populated with parts that have the same total delay dash-number. It is also possible to build active compensation circuits into the parts to force the average delay to match, for example, a reference delay printed on the board.

Bit-to-bit skew within a part is controlled by a combination of the vendor's process control, and what special efforts were taken during the design and layout of the chip to minimize the sensitivity of the part to random variations in the processing.

The clock protocol also influences the effect of delay variations. If the signalling is source synchronized on a chip-by-chip basis, that is each group of bits that is carried by a single bus chip carries its own clock, the sensitivity to interchip delay variations may be minimized. This does add some complexity to the receiver design to ensure that all the bit groups are correctly realigned. The source clock may be used to provide the reference input for delay lock loops to compensate these errors. Errors in arrival time of signals at the inputs of a single bus chip can directly subtract from the signal pulse width.

Each signal can carry its own clock, for example, by using Manchester coding as the synchronization protocol. Any method that carries the clock on the same line as the signal will pay some overhead in bandwidth and latency. One advantage of using a self clocking protocol is that all inputs to a chip bus can be individually actively delay compensated by choosing one of the inputs as a reference for all the others. This can be made to work both for the chip buses and the system chips, and provides a global clock synchronization method as a side effect of minimizing skew errors in the interconnect.

The available bandwidth in a chip bus system in accordance with the invention can be reduced by parasitic reactances in the IC packages and in the interconnect. Reactances in the package can reduce the bandwidth by two mechanisms: low pass filtering the signals and introducing noise. If the IC packages are designed with close attention to the parasitics, it is possible to resolve these problems. For example, a flip chip circuit can be used for very low series inductance, and to maintain a controlled impedance right up to the pads.

Simultaneous switching noise caused by inductance in the ground return path in the chip packages (ground bounce) and crosstalk between signals, also introduce uncertainty in when the transitions are recognized. The same measures that are used to reduce package parasitics to avoid bandwidth reduction will also help reduce these noise sources.

The ability to swap out boards in servers without powering down the system or stopping the clock has become a requirement for new server designs. This is rather difficult to implement using a traditional bus structure because both the insertion and removal of the board produces electrical transients on the backplane. The chip bus of the invention provides an elegant solution to this problem. A disable pin for each port on a bus chip can be provided to force the corresponding port into an idle state where the output is not driven and the input is ignored. This isolates a board being removed or inserted from the bus. The control of these disable signals can be derived from variable length fingers on the backplane connectors.

It is possible to provide small state machines on the chip bus to perform arbitration or protocol functions. If protocol or arbitration logic is embedded in the chip bus, two problems arise. The first is that the gate depth rises beyond the minimum needed to accommodate the fanout. The second is that connections are required between the chip buses to coordinate control. Both factors increase latency and reduce bandwidth. These problems may be reduced by pipelining the bus protocol and arbitration. The pipelining can be done through central or distributed arbitration. In the case of central arbitration, a special arbiter chip is placed on the backplane near the chip buses. To match the performance of the chip buses, all connections to the arbiter must be point-to-point, and the length matched to the signal lines. The shortest pipeline sequence is: request, resolve, grant, transfer. Distributed arbitration can be accomplished by running the same state machine on each of the devices present on the bus. This usually requires dedicating N request lines, where N is the number of devices. Pipelining the arbitration is still required.

When state machines or other intelligence is not used, the chip bus is logically equivalent to passive wires on a backplane. This allows them to run at the maximum speed that the technology will support and permits bit-slicing the bus to accommodate real world packaging constraints.

In the bidirectional communication line implementation, a package would require control pins to control the signal direction. A package would typically require one power or ground pin per two signal pins. Standard pin versus speed tradeoffs may be made when designing a package 70. The chip bus 40 of the invention may be clocked at up to eight times the processor clock speed.

To control clock skew it may be advantageous to use a commercially available clock distribution chip. Such chips compensate for skew by measuring the phase of a reflected signal relative to an internal reference clock.

The pin count required for a package 70 can be reduced as far as desirable by relying upon multiple chips. A 70 bit bus supporting 16 cards can be implemented with 8 chip buses 40 of the type that use separate input and output lines. Each chip bus 40 could be formed in a 432 pin package with the processor and bus running at the same clock speed. This has the advantage of requiring no control signals to the bus chips and can provide more bandwidth if the bus were run at a multiple of the processor clock.

The foregoing descriptions of specific embodiments of the present invention are presented for purposes of illustration and description. They are not intended to be exhaustive or to limit the invention to the precise forms disclosed, obviously many modifications and variations are possible in view of the above teachings. For example, a traditional backplane 22, connectors 48, and cards 49 need not be used. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

I claim:

1. A computer bus, comprising:
   a plurality of computer bus input nodes to receive a plurality of computer bus input signals;
   a plurality of bus bit processors connected to said plurality of computer bus input nodes, all of said bus bit processors being in a single semiconductor package so that shared portions of the computer bus are housed in the single semiconductor package, said semiconductor package including a set of package pins, each of said bus bit processors including a digital gate logic circuit to perform a logical OR operation on a subset of said plurality of computer bus input signals and generate a bus bit processor output signal, said plurality of bus bit processors thereby forming a plurality of bus bit processor output signals; and
   a plurality of computer bus output nodes to receive said plurality of bus bit processor output signals.

2. The computer bus of claim 1 wherein said semiconductor package includes internal traces to electrically connect said package pins to said plurality of bus bit processors.

3. The computer bus of claim 2 further comprising a computer backplane connected to said package pins of said semiconductor package.

4. The computer bus of claim 3 further comprising a set of connectors and communication lines positioned on said computer backplane such that said communication lines electrically connect said package pins and said connectors.

5. The computer bus of claim 1 wherein said digital gate logic circuit includes a signal driver circuit.

6. The computer bus of claim 1 wherein said package pins are used for said plurality of computer bus input nodes and said plurality of computer bus output nodes.

7. A computer bus, comprising:
- a set of communication nodes to receive a plurality of computer bus input signals; and
- a plurality of bus bit processors connected to said communication nodes, all of said bus bit processors being in a single semiconductor package so that shared portions of the computer bus are housed in the single semiconductor package, each of said bus bit processors including a non-reconfigurable digital gate logic circuit to perform a logical OR operation on a subset of said plurality of computer bus input signals and generate a bus bit processor output signal, said plurality of bus bit processors thereby forming a plurality of bus bit processor output signals that are applied to said communication nodes.

8. The computer bus of claim 7 further comprising a computer backplane connected to said communication nodes.

9. A computer bus, comprising:
- a set of communication nodes to receive a plurality of computer bus input signals;
- a plurality of bus bit processors connected to said set of communication nodes, each of said bus bit processors including a digital gate logic circuit to perform a logical OR operation on a subset of said plurality of computer bus input signals and generate a bus bit processor output signal, said plurality of bus bit processors thereby forming a plurality of bus bit processor output signals that are applied to said communication nodes, wherein said subset of said plurality of computer bus input signals is derived from a designated bit of each of said connectors;
- a computer backplane connected to said communication nodes; and
- a set of connectors and communication lines positioned on said computer backplane such that said communication lines electrically connect said communication nodes and said connectors, said connectors supporting computer cards that generate said plurality of computer bus input signals.

10. A method of constructing a computer bus, said method comprising the steps of:
- providing a set of communication nodes to receive a plurality of computer bus input signals; and
- providing a plurality of bus bit processors connected to said communication nodes, all of said bus bit processors being in a single semiconductor package so that shared portions of the computer bus are housed in the single semiconductor package, each of said bus bit processors including a digital gate logic circuit to perform a logical OR operation on a subset of said plurality of computer bus input signals and generate a bus bit processor output signal, said plurality of bus bit processors thereby forming a plurality of bus bit processor output signals that are applied to said communication nodes.

11. The method of claim 10 further comprising the step of providing a computer backplane connected to said communication nodes.

12. A method of constructing a computer bus, said method comprising the steps of:
- providing a set of communication nodes to receive a plurality of computer bus input signals;
- providing a plurality of bus bit processor connected to said communication nodes, each of said bus bit processors including a digital gate logic circuit to perform a logical OR operation on a subset of said plurality of computer bus input signals and generate a bus bit processor output signal, said plurality of bus bit processors thereby forming a plurality of bus bit processor output signals that are applied to said communication nodes; and
- providing a computer backplane connected to said communication nodes;
- providing a set of connectors and communication lines positioned on said computer backplane such that said communication lines electrically connect said communication nodes and said connectors, said connectors supporting computer cards that generate said plurality of computer bus input signals.

13. A method of operating a computer bus, said method comprising the steps of:
- applying a plurality of computer bus input signals to a set of computer bus input nodes;
- processing said set of computer bus input signals with a set of digital gate logical OR circuits to generate bus bit output signals, all of said digital gate logical OR circuits being in a single semiconductor package so that shared portions of the computer bus are housed in the single semiconductor package; and
- routing said bus bit output signals to a set of computer bus output nodes.

14. A method of operating a computer bus, said method comprising the steps of:
- applying a plurality of pipelined computer bus input signals to a set of computer bus input nodes using point-to-point connections;
- processing said set of computer bus input signals with a set of digital gate logical OR circuits to generate bus bit output signals; and
- routing said bus bit output signals to a set of computer bus output nodes.

15. The method of claim 14 wherein said routing step includes the step of routing pipelined bus bit output signals to said set of computer bus output nodes.

16. The method of claim 14 further comprising the step of routing said bus bit output signals to computer system cards using point-to-point connections.

17. The method of claim 14 further comprising the step of generating said computer bus input signals with computer system cards.

18. The method of claim 14 wherein said processing step includes the step of processing said set of computer bus input signals and said bus bit output signals with signal driver circuits.

* * * * *